United States Patent
Kim

(10) Patent No.: US 9,294,596 B2
(45) Date of Patent: Mar. 22, 2016

(54) DISPLAY OF AN ELECTRONIC DEVICE SUPPORTING MULTIPLE OPERATION MODES

(71) Applicant: Samsung Electronics Co., Ltd., Gyeonggi-do (KR)

(72) Inventor: Geon-Soo Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 40 days.

(21) Appl. No.: 14/194,900

(22) Filed: Mar. 3, 2014

(65) Prior Publication Data

US 2014/0274214 A1    Sep. 18, 2014

(30) Foreign Application Priority Data

Mar. 13, 2013  (KR) .................. 10-2013-0026961

(51) Int. Cl.
  *H04M 1/00*   (2006.01)
  *H04M 1/02*   (2006.01)
  *G06F 1/16*   (2006.01)
  *G06F 3/048*  (2013.01)

(52) U.S. Cl.
  CPC ........... *H04M 1/0266* (2013.01); *G06F 1/1677* (2013.01); *G06F 3/048* (2013.01); *G06F 2200/1634* (2013.01)

(58) Field of Classification Search
  CPC .............. H04M 1/72519; H04M 1/72583; H04M 1/72522; H04M 1/72547; H04M 1/0214; H04M 1/23; H04M 1/3833; H04M 1/0247; H04M 1/0237
  USPC .................. 455/550.1, 566, 575.1, 90.3
  See application file for complete search history.

(56) References Cited

U.S. PATENT DOCUMENTS

| | | | |
|---|---|---|---|
| 5,584,054 A * | 12/1996 | Tyneski et al. ................ | 455/566 |
| 2002/0086702 A1 | 7/2002 | Lai et al. | |
| 2007/0081638 A1 | 4/2007 | Taneya et al. | |
| 2011/0065474 A1 * | 3/2011 | Won et al. .................. | 455/556.1 |
| 2011/0175747 A1 | 7/2011 | Small et al. | |
| 2012/0212430 A1 | 8/2012 | Jung et al. | |
| 2012/0250241 A1 * | 10/2012 | Minemura et al. ........ | 361/679.21 |

FOREIGN PATENT DOCUMENTS

| | | |
|---|---|---|
| EP | 2 296 355 A2 | 3/2011 |
| KR | 10-0434460 B1 | 5/2004 |
| KR | 10-2005-0037245 A | 4/2005 |
| KR | 10-2011-0028148 A | 3/2011 |
| KR | 10-2012-0010348 A | 2/2012 |
| KR | 10-1124151 B1 | 2/2012 |
| KR | 10-2012-0024299 A | 3/2012 |

* cited by examiner

*Primary Examiner* — Nhan Le
(74) *Attorney, Agent, or Firm* — Cha & Reiter, LLC.

(57) ABSTRACT

A method and an apparatus output data from an electronic device. The method includes: identifying at least one display area matched to at least one opening area formed in a part of a cover of the electronic device on a display screen of a display unit of the electronic device; operating the at least one display area in a first mode, and operating at least a partial area of a remaining display area of the display screen in a second mode.

21 Claims, 9 Drawing Sheets

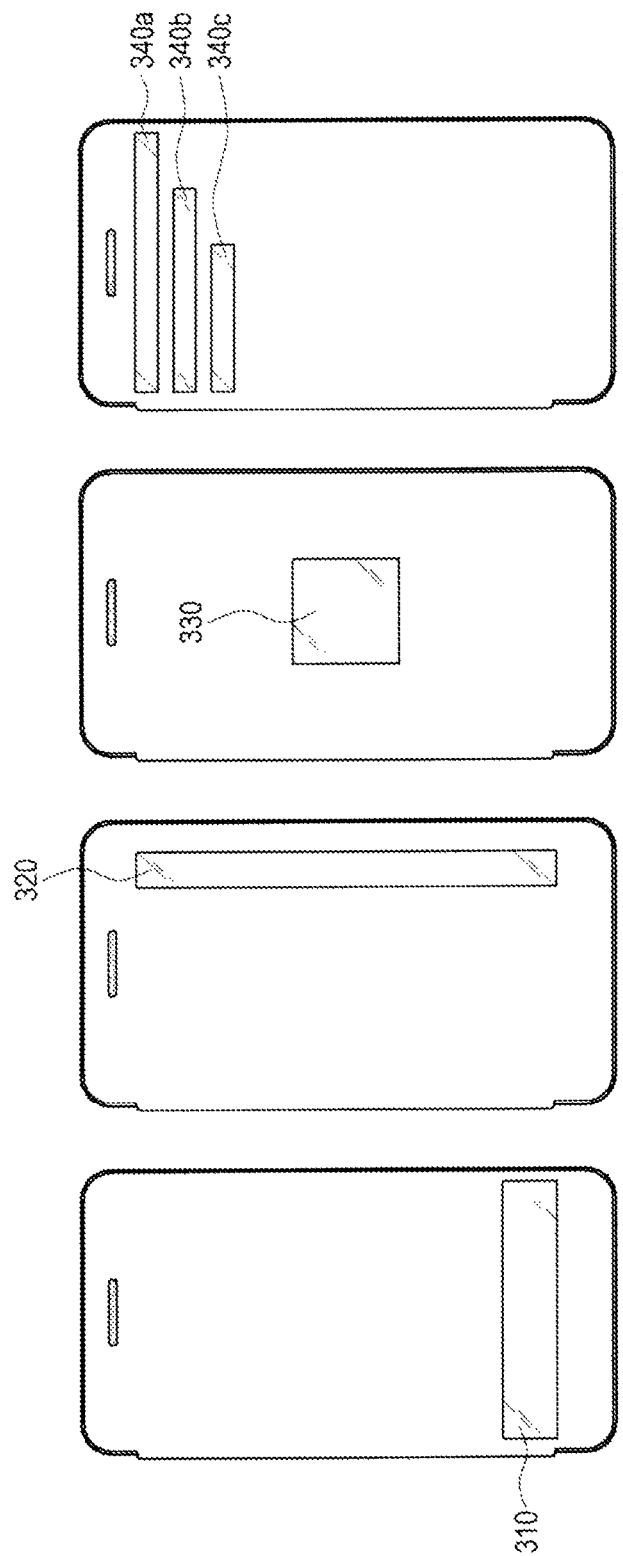

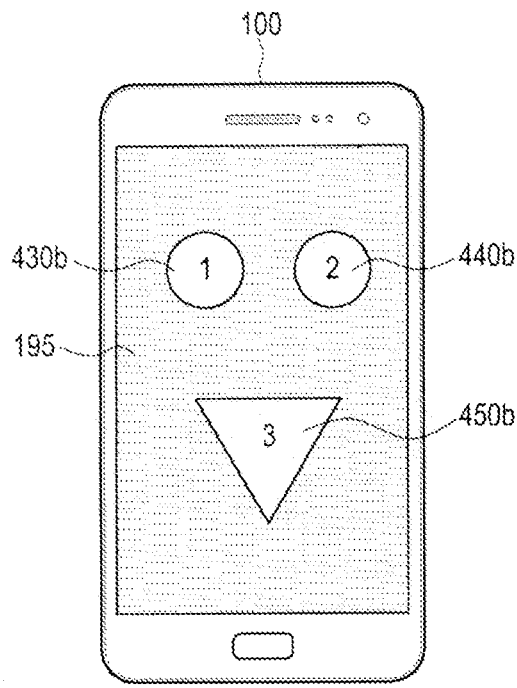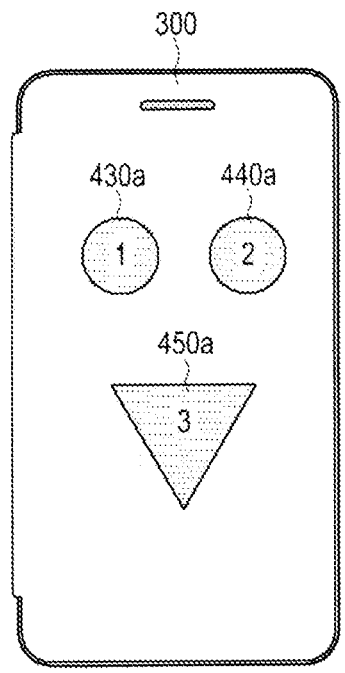
FIG.9A  FIG.9B
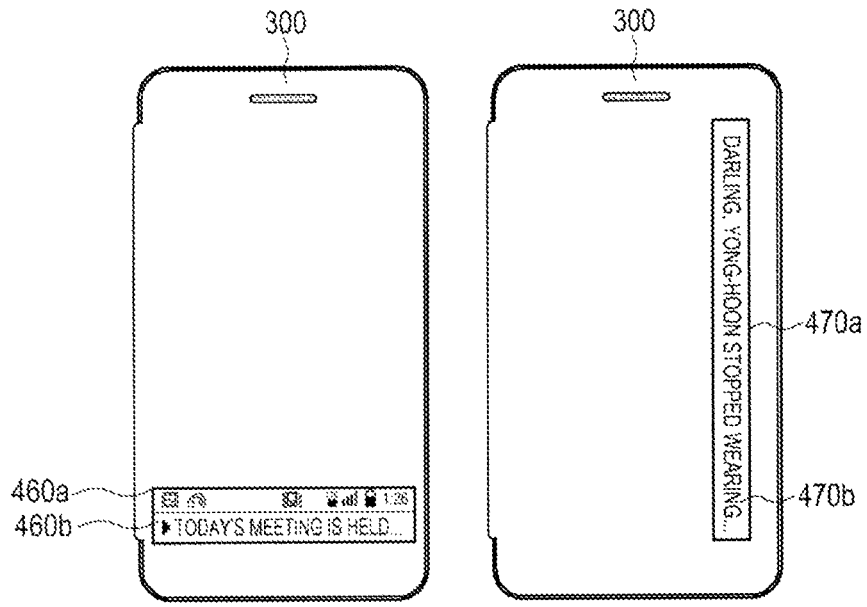
FIG.10A  FIG.10B

US 9,294,596 B2

DISPLAY OF AN ELECTRONIC DEVICE SUPPORTING MULTIPLE OPERATION MODES

CLAIM OF PRIORITY

This application claims, pursuant to 35 U.S.C. §119(a), priority to and the benefit of the earlier filing date of Korean Patent Application Serial No. 10-2013-0026961, which was filed in the Korean Intellectual Property Office on Mar. 13, 2013, the entire contents of which are incorporated herein by reference.

BACKGROUND

1. Technical Field

The present disclosure relates generally to an electronic device, and more particularly, to a method for providing data by using an electronic device, for example, a mobile phone, on which a cover is mounted.

2. Description of the Related Art

The use of portable terminals, such as a smart phone or a tablet Personal Computer (PC) is becoming more common.

Users of portable terminals use various types of cases to protect their own portable terminals. For example, cases of portable terminals include a flip cover case (hereinafter, a flip cover), a sliding cover case (hereinafter, a sliding cover), a folder cover case (hereinafter, a folder cover), etc.

A flip cover has many positive aspects in terms of the protection of a portable terminal and in terms of design. However, the flip cover has a problem of causing much inconvenience during the use of the portable terminal.

For example, when a cover of the flip cover of the portable terminal closes, a user cannot identify a display screen of the portable terminal. Accordingly, the user has inconvenience in that he/she must repeat a process in which he/she must manually open the cover of the flip cover in order to identify information displayed by the portable terminal.

Therefore, the flip cover in the prior art which is mounted on the portable terminal for the use thereof is limited in providing only a partial function of protecting the portable terminal or improving aesthetic satisfaction by using the flip cover designed so as to suit the user's taste.

SUMMARY

Accordingly, the present invention has been made to address at least the above problems and/or disadvantages and to provide at least the advantages described below.

An aspect of the present invention is to supplement a method for using a flip cover, which provides only a partial function of protecting an electronic device, for example, a portable terminal, or improving aesthetic satisfaction.

In accordance with an aspect of the present invention, a method for displaying information by using the electronic device is provided. The method may include identifying at least one display area, matched to at least one opening area formed in a part of a cover of the electronic device, on a display screen of a display unit of the electronic device; and operating the at least one display area in a first mode, and operating at least a partial area of a remaining display area of the display screen in a second mode.

In accordance with another aspect of the present invention, an electronic device is provided. The electronic device may include a display unit having a display screen; a cover in which at least one opening area is formed; and a controller for performing a control operation so as to identify at least one display area matched to the at least one opening area on the display screen, so as to operate the at least one display area in a first mode, and so as to operate at least a partial area of a remaining display area of the display screen in a second mode, when it is sensed that the cover is at a predetermined distance from the display screen of the display unit.

BRIEF DESCRIPTION OF THE DRAWINGS

The above and other aspects, features, and advantages of the present invention will be more apparent from the following detailed description taken in conjunction with the accompanying drawings, in which:

FIG. 4A, FIG. 4B, FIG. 4C and FIG. 4D are second illustrative views of the process for displaying information in the electronic device on which the flip cover is mounted, according to the exemplary embodiment of the present invention;

FIG. 9A and FIG. 9B are seventh illustrative views of the process for displaying information in the electronic device on which the flip cover is mounted, according to the exemplary embodiment of the present invention;

FIG. 10A and FIG. 10B are eighth illustrative views of the process for displaying information in the electronic device on which the flip cover is mounted, according to the exemplary embodiment of the present invention.

DETAILED DESCRIPTION

Figure 1:
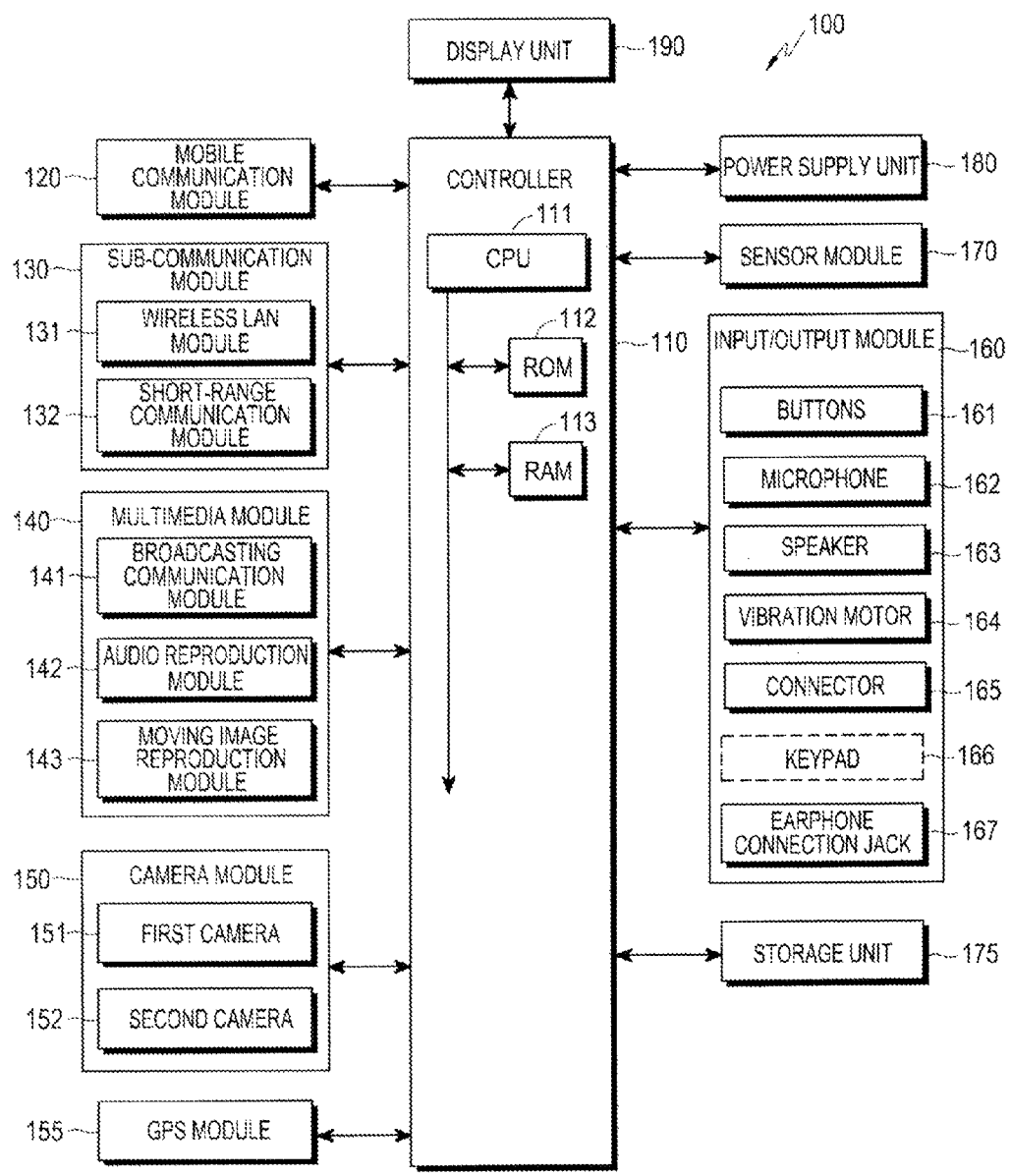
FIG. 1 is a block diagram schematically illustrating a configuration of an electronic device according to an exemplary embodiment of the present invention.

Hereinafter, exemplary embodiments of the present invention will be described in detail with reference to the accompanying drawings. However, the present invention is not limited or restricted by the exemplary embodiments thereof. Throughout the specification and drawings, an identical reference numeral refers to elements that all perform a substantially identical function. In the following description, a detailed explanation of known related functions and constructions may be omitted to avoid unnecessarily obscuring the subject matter of the present invention. In addition, terms described herein, which are defined with reference to the functions of the present invention, may be implemented differently depending on a user or operator's intention and practice. Therefore, the terms should be understood on the basis of the disclosure throughout the specification. The principles and features of the present invention may be employed in varied and numerous exemplary embodiments without departing from the scope of the present invention.

Furthermore, although the drawings represent exemplary embodiments of the present invention, the drawings are not necessarily to scale and certain features may be exaggerated or omitted in order to more clearly illustrate and explain the present invention.

Among the terms set forth herein, a terminal, a mobile device, a portable device, or an electronic device refers to any kind of device capable of processing data which is transmitted or received to or from any external entity. The terminal, the mobile device, the portable device, or the electronic device may display icons or menus on a screen to which stored data and various executable functions are assigned or mapped. The terminal, the mobile device, the portable device, or the electronic device may include a computer, a notebook, a tablet PC, a cellphone, and any known type of electronic device.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the electronic device such that a user can easily select a desired function or data. In particular, each icon has a mapping relation with any function being executable in the electronic device or with any data stored in the electronic device and is used for processing functions or selecting data in the electronic device. When a user selects one of the displayed icons, the electronic device identifies a particular function or data associated with the selected icon. Then the electronic device executes the identified function or displays the identified data.

Among the terms set forth herein, data refers to any kind of information processed by the electronic device, including text and/or images received from any external entities, messages transmitted or received, and information created when a specific function is executed by the electronic device.

Although the terms including ordinal numbers such as first and second may be used herein to describe various elements, these elements should not be limited by these terms. These terms are only used to distinguish one element from another. For example, a first element could be termed a second element, and similarly, a second element could be termed a first element, without departing from the scope of the present invention. The terminology used herein is for the purpose of describing particular exemplary embodiments only, and is not intended to limit the present invention. As used herein, the singular forms "a", "an", and "the" are intended to include the plural forms as well, unless the context clearly indicates otherwise.

FIG. 1 is a block diagram schematically illustrating a configuration of an electronic device, for example, a portable terminal, according to an exemplary embodiment of the present invention.

The exemplary embodiment of the present invention is implemented by an electronic device which may be any known type of electronic apparatus which is easily carried in terms of weight or size. Examples of electronic devices according to the exemplary embodiment of the present invention may include a feature phone of the prior art, and other known types of electronic devices, for example, a smart phone and a tablet PC, which are managed by operating systems such as BADA, commercially available from SAMSUNG ELECTRONICS CO., LTD.; TIZEN, commercially available from the LINUX FOUNDATION; WINDOWS, such as, for example, WINDOWS 8, commercially available from MICROSOFT CORPORATION; IOS, commercially available from APPLE, INC., and ANDROID, commercially available from GOOGLE, INC. In addition, the electronic device according to the exemplary embodiment of the present invention may be a laptop computer, a digital camera, a video phone, or the like. Here, it will be apparent to those skilled in the art that the electronic devices according to the exemplary embodiment of the present invention are not limited to the examples of electronic devices as described above.

Referring to FIG. 1, the electronic device 100 may be connected to an external device by using an external device connection unit, such as a sub-communication module 130, a connector 165, or an earphone connection jack 167. The external devices may include various devices, such as an earphone, an external speaker, a Universal Serial Bus (USB), a memory, a charger, a cradle/dock, a Digital Multimedia Broadcasting (DMB) antenna, a device for mobile payment, a health care device (a blood glucose meter or the like), a video game console, and a car navigation device, each of which may be removed or detached from, and connected or attached to the electronic device 100 and may be connected to the electronic device 100 by a wire. Also, the external devices may include short-range communication devices such as a communication device which uses BLUETOOTH, a short range wireless communications technology at the 2.4 GHz band, commercially available from the BLUETOOTH SPECIAL INTEREST GROUP, INC., and a Near Field Communication (NFC) device, each of which may be wirelessly connected to the electronic device 100 through short-range communication, through a direct communication device which uses WI-FI, a wireless technology for data exchange over a computer network, commercially available from the WI-FI ALLIANCE, and/or through a wireless Access Point (AP). Also, the external devices may include another electronic device, a mobile phone, a smart phone, a tablet PC, a desktop PC, and a server.

Figures 3A, 3B:
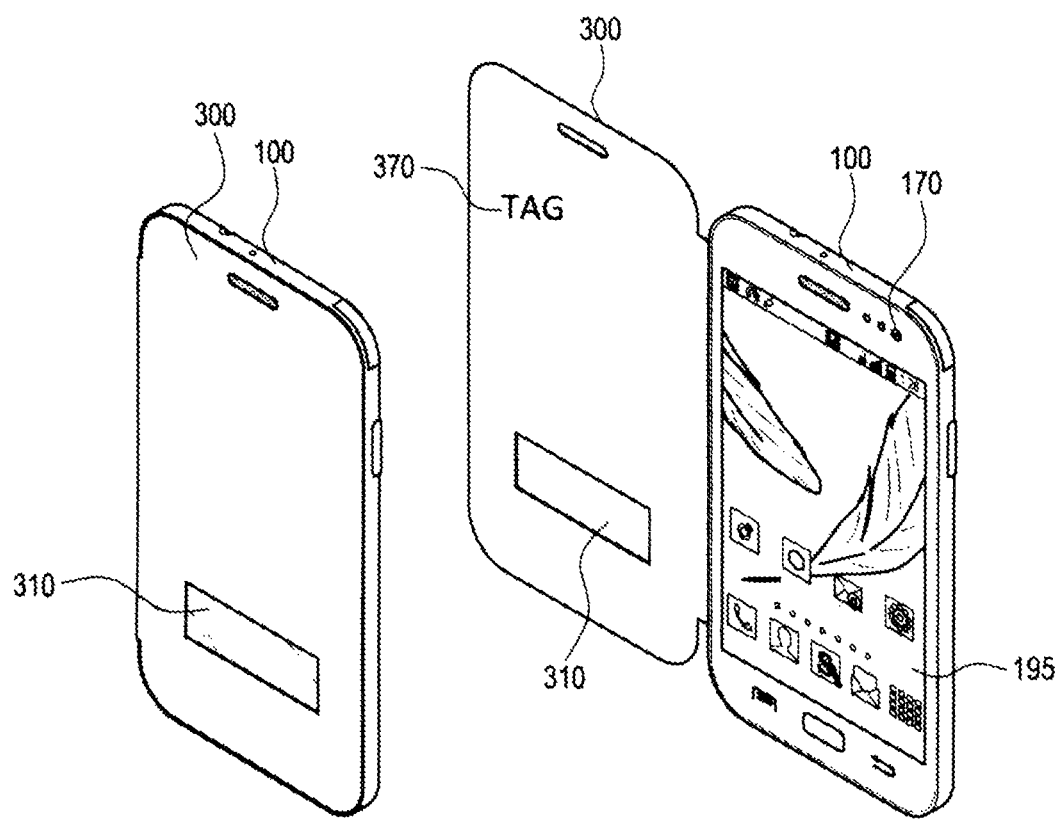
FIG. 3A and FIG. 3B are first illustrative views of the process for displaying information in the electronic device on which the flip cover is mounted, according to the exemplary embodiment of the present invention.

Referring to FIG. 1, the electronic device 100 may include a controller 110, a mobile communication module 120, the sub-communication module 130, a multimedia module 140, a camera module 150, a Global Positioning System (GPS) module 155, an input/output module 160, a sensor module 170, a storage unit 175, a power supply unit 180, and a display unit 190 having a display screen 195, shown in FIG. 3B. The sub-communication module 130 includes at least one of a wireless Local Area Network (LAN) module 131 and a short-range communication module 132. The multimedia module 140 includes at least one of a broadcasting communication module 141, an audio reproduction module 142, and a moving image reproduction module 143. The camera module 150 may include at least one of a first camera 151 and a second camera 152. The input/output module 160 includes at least one of buttons 161, a microphone 162, a speaker 163, a vibration motor 164, the connector 165, and a keypad 166.

According to the control of the controller 110, the mobile communication module 120 enables the electronic device 100 to be connected to an external device through mobile communications by using at least one antenna or multiple antennas. The mobile communication module 120 may transmit and receive a wireless signal for a voice call, a video call, a Short Message Service (SMS) or a Multimedia Messaging Service (MMS) to/from a mobile phone, a smart phone, a tablet PC or another electronic device, which has a telephone number which is input to the electronic device 100.

The sub-communication module 130 may include at least one of the wireless LAN module 131 and the short-range communication module 132. For example, the sub-communication module 130 may include only the wireless LAN module 131, or may include only the short-range communication module 132, or may include both the wireless LAN module 131 and the short-range communication module 132.

The wireless LAN module 131 may include a module for using WI-FI, a wireless technology for data exchange over a computer network, commercially available from the WI-FI ALLIANCE. In association with the controller 110, the wireless LAN module 131 may be connected to the Internet at a place where a wireless Access Point (AP) is installed. The wireless LAN module 131 may support a wireless LAN standard such as the IEEE802.11x standard of the INSTITUTE OF ELECTRICAL AND ELECTRONIC ENGINEERS (IEEE).

In association with the controller 110, the short-range communication module 132 provides a short-range wireless communication function. Examples of the short-range communication module 132 may include a module for using BLUETOOTH, a short range wireless communications technology at the 2.4 GHz band, commercially available from the BLUETOOTH SPECIAL INTEREST GROUP, INC., or may include an Infrared Data Association (IrDA) module, a Near Field Communication (NFC) module, etc.

The multimedia module 140 may include the broadcasting communication module 141, the audio reproduction module 142, or the moving image reproduction module 143. According to the control of the controller 110, the broadcasting communication module 141 may receive a broadcast signal (for example, a TV broadcast signal, a radio broadcast signal, or a data broadcast signal) and broadcast additional information (for example, an Electronic Program Guide (EPS) or an Electronic Service Guide (ESG)), which are transmitted by a broadcast station through a broadcast communication antenna. According to the control of the controller 110, the audio reproduction module 142 may reproduce a stored or received digital audio file, for example, a file having a file extension of mp3, wma, ogg, or way. According to the control of the controller 110, the moving image reproduction module 143 may reproduce a stored or received digital moving image file, for example, a file having a file extension of mpeg, mpg, mp4, avi, mov, or mkv. The moving image reproduction module 143 may reproduce a digital audio file.

Alternatively, the multimedia module 140 may exclude the broadcasting communication module 141, and may include the audio reproduction module 142 and the moving image reproduction module 143. Also, the audio reproduction module 142 or the moving image reproduction module 143 of the multimedia module 140 may be included in the controller 110.

The camera module 150 may include at least one of the first camera 151 and the second camera 152, each for capturing a still image or a moving image according to the control of the controller 110. Also, the first camera 151 or the second camera 152 may include an auxiliary light source, such as a flash, which provides the amount of light required to capture an image. The first camera 151 may be mounted on a front surface of the electronic device 100, and the second camera 152 may be mounted on a rear surface of the electronic device 100. Otherwise, the first camera 151 and the second camera 152 may be disposed in such a manner as to be adjacent to each other, for example, a distance between the first camera 151 and the second camera 152 is greater than 1 cm. and is less than 8 cm., and may capture a three-dimensional still image or a three-dimensional moving image.

The GPS module 155 may receive a radio wave from each of multiple GPS satellites in orbit around the Earth, and may calculate a location of the electronic device 100 by using a Time of Arrival (TOA) from each of the GPS satellites to the electronic device 100.

The input/output module 160 may include at least one of the multiple buttons 161, the microphone 162, the speaker 163, the vibration motor 164, the connector 165 and the keypad 166.

The buttons 161 may be formed on a front surface, a lateral surface or a rear surface of a housing of the electronic device 100, and may include at least one of a power/lock button, a volume button, a menu button, a home button, a back button and a search button.

According to the control of the controller 110, the microphone 162 may receive a voice or sound as input, and may generate an electrical signal.

In addition, according to the control of the controller 110, the speaker 163 may output sounds corresponding to various signals (for example, a wireless signal, a broadcast signal, a digital audio file, a digital moving image file, and a photographic image) from the mobile communication module 120, the sub-communication module 130, the multimedia module 140 and the camera module 150, to the exterior of the electronic device 100. The speaker 163 may output a sound (for example, a button operation sound or a ringback tone associated with a telephone call) corresponding to a function that the electronic device 100 performs. The speaker 163, which may include multiple speakers 163, may be disposed at an appropriate position or appropriate positions in the housing of the electronic device 100.

According to the control of the controller 110, the vibration motor 164 may convert an electrical signal into a mechanical vibration. For example, when the electronic device 100 in a vibration mode receives a voice call from another device, the vibration motor 164 of the electronic device 100 operates. The vibration motor 164, which may include multiple vibration motors 164, may be mounted within the housing of the electronic device 100. The vibration motor 164 may operate in response to a touch action of a user who touches a touch screen, being the display screen 195, of the display unit 190 and a continuous movement of a touch on the touch screen of the display unit 190.

The connector 165 may be used as an interface for connecting the electronic device 100 to an external device or a power source. According to the control of the controller 110, through a wired cable connected to the connector 165, the electronic device 100 may transmit data stored in the storage unit 175 of the electronic device 100 to an external device or may receive data from the external device. Also, through the wired cable connected to the connector 165, the electronic device 100 may receive power from the power source or may charge a battery by using the power source.

The keypad 166 may receive a key input from the user in order to control the electronic device 100. The keypad 166 includes a physical keypad installed on the front surface of the electronic device 100 or a virtual keypad displayed on the touch screen being the display screen 195 of the display unit 190. The physical keypad installed on the front surface of the electronic device 100 may be excluded according to the performance requirements, structure, or implementation of the electronic device 100.

A plug of an earphone may be inserted into the earphone connection jack 167, so that the earphone may be connected to the electronic device 100.

The sensor module 170 may include at least one sensor for detecting the state of the electronic device 100. For example, the sensor module 170 may include a Hall sensor for detecting a change in a magnetic field which changes according to the approach of a magnetic object, a proximity sensor for detecting whether the user is close to the electronic device 100, an illuminance sensor for detecting the amount of light around the electronic device 100, a motion sensor for detecting the motion of the electronic device 100, for example, the rotation of the electronic device 100, or acceleration or vibration applied to the electronic device 100, a geomagnetic sensor for detecting a compass direction or an orientation of the electronic device 100 by using the Earth's magnetic field, a gravity sensor for detecting the direction of gravity, and an altimeter for measuring atmospheric pressure and detecting an altitude of the electronic device 100. At least one sensor may detect the state of the electronic device 100, may generate a signal corresponding to the detection, and may transmit the generated signal to the controller 110. According to the performance requirements of the electronic device 100, sensors may be added to or removed from the sensor module 170.

By using the sensor module 170, as shown in FIG. 3B, for example, by using an illuminance sensor or a Hall sensor according to the exemplary embodiment of the present invention, the controller 110 may determine whether a flip cover (or a cover) is opened, for example, when the cover is not within a preset distance from the display screen 195 of the display unit 190, or closed, for example, when the cover is within the preset distance from or is close to the display screen 195 of the display unit 190.

According to the control of the controller 110, the storage unit 175 may store a signal or data which is input/output in response to an operation of each of the mobile communication module 120, the sub-communication module 130, the multimedia module 140, the camera module 150, the GPS module 155, the input/output module 160, the sensor module 170, and the touch screen of the display unit 190. The storage unit 175 may store a control program for controlling the electronic device 100 or a control program for the controller 110, and applications. Here, the storage unit 175 may be at least one of a Read Only Memory (ROM) 112 and a Random Access Memory (RAM) 113 within the controller 110.

Also, the storage unit 175 may further include an external memory, such as a Compact Flash (CF) device, a Secure Digital (SD) card, a Micro Secure Digital (Micro-SD) card, a Mini Secure Digital (Mini-SD) card, an Extreme Digital (xD) card, or a memory stick. Also, the storage unit 175 may also include a disk storage device, such as a Hard Disk Drive (HDD) or a Solid State Disk (SSD).

According to the control of the controller 110, the power supply unit 180 may supply power to a single battery or multiple batteries disposed in the housing of the electronic device 100. The single battery or the multiple batteries supply power to the electronic device 100. Also, the power supply unit 180 may supply power provided by an external power source to the electronic device 100 through a wired cable connected to the connector 165. Also, the power supply unit 180 may supply power, which is wirelessly provided by an external power source, to the electronic device 100 by using a wireless charging technology.

The display unit 190 having the display screen 195 may include a Liquid Crystal Display (LCD), or may include Passive Matrix Organic Light Emitting Diodes (PMOLEDs) or Active Matrix Organic Light Emitting Diodes (AMOLEDs) as Organic Light Emitting Diodes (OLEDs), and outputs various pieces of display information. The display unit 190 may include a touch screen controller and a touch screen as the display screen 195, shown in FIG. 3B, for example, a Touch Screen Panel (TSP), which is implemented by a resistive touch screen, a capacitive touch screen, an infrared touch screen or an acoustic wave touch screen. Also, the display unit 190 may include not only a touch screen but also a controller corresponding to a digitizer which can receive the user's pen input, for example, an electromagnetic induction-type touch input device, such as an S PEN of SAMSUNG ELECTRONICS CO., LTD. using an electromagnetic induction method.

The display unit 190 may provide the user with a user interface associated with various services, for example, telephone call processing, data transmission, broadcasting, and photographing. The touch screen of the display unit 190 may transmit an analog signal corresponding to at least one touch, which is input to the user interface, to a touch screen controller. The touch screen of the display unit 190 may receive at least one touch as input from the user's body, for example, fingers including thumbs, or an input device, for example, a stylus pen, enabling a touch.

In the present invention, a touch is not limited to the touch of the user's body or the input device enabling a touch on the touch screen of the display unit 190, but may also include a non-contact touch, for example, a detectable distance between the touch screen of the display unit 190 and the user's body or the input device enabling a touch with the detectable distance equal to or less than 1 mm.

The touch screen controller converts an analog signal received from the touch screen of the display unit 190 into a digital signal, for example, X and Y coordinates, and provides the digital signal to the controller 110. The controller 110 may control the touch screen of the display unit 190 by using the digital signal received from the touch screen of the display unit 190. For example, in response to a touch, the controller 110 may perform a control operation so as to select an application icon displayed on the touch screen of the display unit 190 or execute an application corresponding to the application icon. Here, the touch screen controller may be included in the controller 110.

Meanwhile, in the exemplary embodiment of the present invention, the user may set a display area of a display screen, which is matched to an opening area of the flip cover, by using a touch input. Accordingly, in the exemplary embodiment of the present invention, examples of a touch input include both an input sensed by the touch screen and an input sensed by the digitizer.

The controller 110 may include a Central Processing Unit (CPU) 111, the ROM 112 which stores a control program for controlling the electronic device 100, and the RAM 113 which stores a signal or data received from the exterior of the electronic device 100, or which is used as a memory area for a task performed by the electronic device 100. The CPU 111 may include a single-core processor, a dual-core processor, a triple-core processor, or a quad-core processor. The CPU 111, the ROM 112 and the RAM 113 may be interconnected by an internal bus. The controller 110 may control the mobile communication module 120, the sub-communication module 130, the multimedia module 140, the camera module 150, the Global Positioning System (GPS) module 155, the input/ output module 160, the sensor module 170, the storage unit 175, the power supply unit 180, and the display unit 190.

Meanwhile, the controller 110 according to the exemplary embodiment of the present invention may control a series of processes for performing both an operation of identifying at least one display area, matched to at least one opening area formed in a part of the cover of the electronic device 100, on the display screen 195 of the display unit 190 of the electronic device 100, and an operation of operating the at least one display area in a first mode and operating at least a partial area of a remaining display area of the display screen in a second mode. A specific operation of the controller 110 according to the exemplary embodiment of the present invention is described below with reference to FIG. 2.

Figure 2:
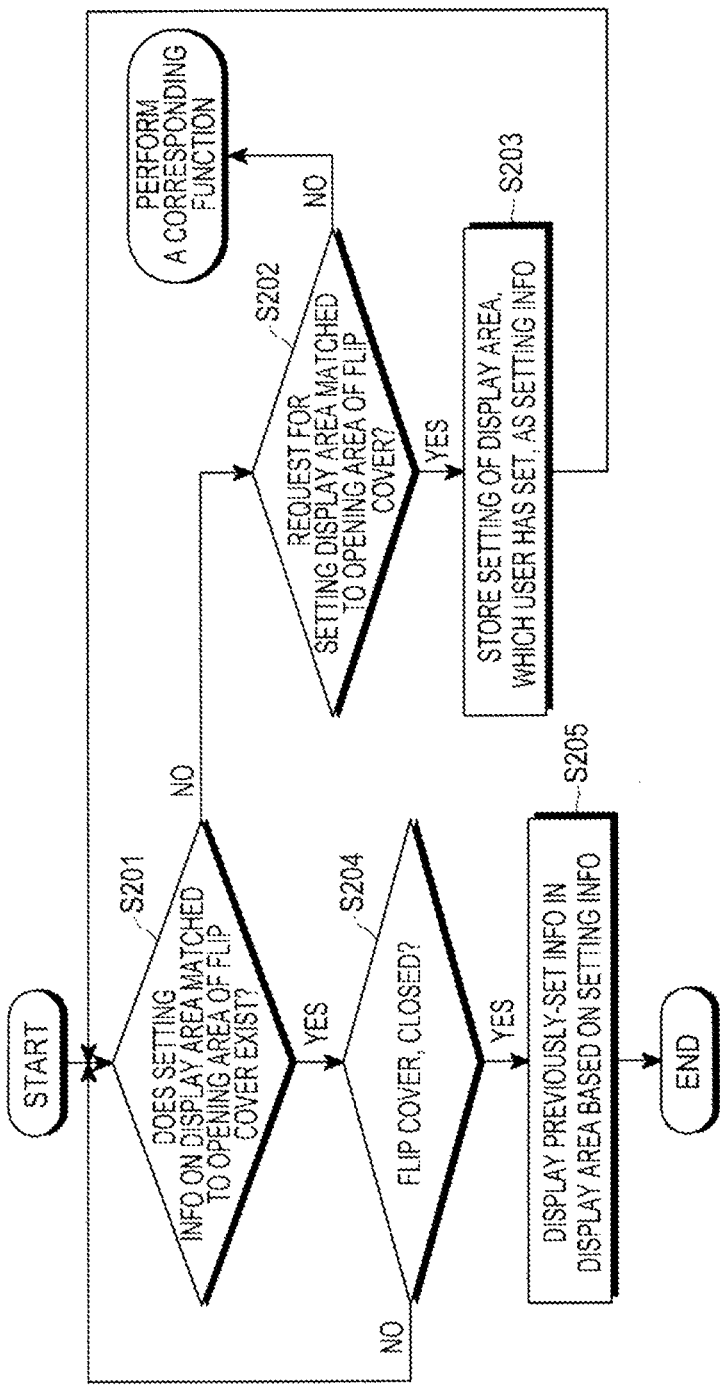
FIG. 2 is a flowchart illustrating a process for displaying information in the electronic device on which a flip cover is mounted, according to the exemplary embodiment of the present invention.

FIG. 2 is a flowchart illustrating a process for displaying information in the electronic device 100 on which a flip cover is mounted, according to the exemplary embodiment of the present invention. FIGS. 3A to 6 are the first illustrative view to the fourth illustrative view, respectively, each showing the process for displaying information in the electronic device 100 on which a flip cover is mounted, according to the exemplary embodiment of the present invention. FIGS. 7 to 11 are the fifth illustrative view to the ninth illustrative view, respectively, each showing the process for displaying information in the electronic device 100 on which the flip cover is mounted, according to the exemplary embodiment of the present invention. Various exemplary embodiments of the present invention are described below with reference to FIGS. 3A toll.

In step 201, a controller 110 may determine whether there exists setting information of a display area of a display screen 195 matched to an opening area of a flip cover 300.

First, referring to FIGS. 3A and 3B, the electronic device 100 according to the exemplary embodiment of the present invention may have the flip cover 300, with the flip cover 300 in a closed configuration shown in FIG. 3A, and with the flip cover 300 in an open configuration shown in FIG. 3B. When the user uses the electronic device 100, he/she may open a cover of the flip cover 300 from the configuration in FIG. 3A to the configuration in FIG. 3B. When the user does not use the electronic device 100 or while the user performs a voice call, he/she may close the cover of the flip cover 300 from the configuration in FIG. 3B to the configuration in FIG. 3A. At this time, in the exemplary embodiment of the present invention, the flip cover 300 refers to a case of the electronic device 100 which may protect, for example, by covering, more than a predetermined part of the display screen 195, such as glass of the display unit 190. Accordingly, it will be apparent to those skilled in the art that the present invention is not limited by the term "flip cover."

Meanwhile, in FIGS. 3A and 3B, the flip cover 300 according to the exemplary embodiment of the present invention includes an opening area 310 obtained by perforating a part of the flip cover 300 having a low possibility of being touched by a body part of the user. In one exemplary embodiment shown in FIGS. 3A and 3B, the opening area 310 is a hollow opening exposing the corresponding and complementary portion of the display screen 195 underneath the opening area 310. In an alternative embodiment, the opening area 310 may include transparent or translucent material, such as glass or plastic, allowing the user to view the display screen 195 of the electronic device 100 through the material in the opening area 310, when the flip cover 300 is in the closed configuration in FIG. 3A. Referring to FIGS. 4A to 4D, the flip covers 300 according to the exemplary embodiment of the present invention may include opening areas 310, 320, 330, 340a, 340b and 340c, respectively, which have various shapes and positions, respectively. Although the opening areas 310, 320, 330, 340a, 340b and 340c are shown as square or rectangular areas, alternatively, the opening areas 310, 320, 330, 340a, 340b and 340c may have any known shape, positions, and orientations in the flip cover 300.

When each of the flip covers 300 including the opening areas, as described with reference to FIGS. 3A to 4D, is mounted on the electronic device 100, and a cover of each of the flip covers 300 is closed, as shown in FIG. 3A, only a specific area in the entire area of the display screen 195 of the electronic device 100 is exposed, with the specific area substantially matching and complementing the opening area of the flip cover 300 in the closed position, as shown in FIG. 3A.

Referring to FIG. 3B, although information in a particular form is being displayed, for example, an image is being displayed, on the entire display screen 195, in a state where the cover of the flip cover is open, such information may be displayed, for example, a part of an entire image may be displayed, in only an area of the display screen 195 which is exposed through each of the opening areas 310, 320, 330, 340a, 340b and 340c in FIGS. 4A to 4D, respectively.

Specifically, in a state where the cover of the flip cover is closed as illustrated in FIG. 3A, the user may identify information only through each of the opening areas 310, 320, 330, 340a, 340b and 340c in FIGS. 4A to 4D, respectively.

In various exemplary embodiments of the present invention, an area of the display screen 195, which is exposed through the opening area of the flip cover 300, is referred to as a display area matched to the opening area.

Meanwhile, various exemplary embodiments of the present invention relate to a method or an apparatus for displaying information in a partial area of the display screen 195, which is exposed through each of the opening areas as described above with reference to FIGS. 3A to 4D, which is seen through each of the opening areas, or which is transparently or translucently seen through transparent or translucent material in each of the opening areas. For example, in the exemplary embodiment of the present invention, when the cover of the flip cover 300 including the opening area is closed, as shown in FIG. 3A, it is necessary to identify which position is matched to an area, such as a display area exposed through the opening area, in the entire area of the display screen 195, what information is displayed in the display area, and the like. The identification of such positions and such information may be performed with reference to setting information of the display area, which is used and stored by the electronic device 100. Accordingly, setting information of each display area may include position data of each display area, type data related to each display area, order data related to the display areas, etc.

For example, according to the exemplary embodiment of the present invention, when the cover of the flip cover 300 including the opening areas enters a predetermined distance from the display unit 190, for example, within 5 mm., which is detected by the sensor module 170 shown in FIGS. 1 and 3B, or in the case of being closed as shown in FIG. 3A, the position data of the setting information may include data on a position, for example, a pixel position of each of display areas which are exposed through the opening areas in the entire area of the display screen 195, respectively. Also, when the cover of the flip cover 300 including the opening areas is closed, the type data of the setting information may include data on the type of information which is to be displayed in each display area. Lastly, when the flip cover 300 has the multiple opening areas and thus when there are a plurality of display areas matched to the multiple opening areas, the order data of the setting information may include data on the order of displaying the display areas.

The setting information of each display area may be acquired through an application market such as GOOGLE STORE, an online market commercially available from GOOGLE, INC., or may be acquired through downloading of the setting information of each display area which is shared by users. On the other hand, the user may manually set the setting information of each display area in steps S202 and S203 as described below.

Referring back to FIG. 2, if no setting information is detected in step 201, the controller 110 may determine in step 202 whether a request is made for setting the display area of the display screen 195 matched to the opening area of the flip cover 300. If no request is made, the method performs a corresponding or different function of the electronic device 100.

However, when a result of the determination in step 202 shows that the request is made for setting the display area of the display screen 195 matched to the opening area of the flip cover 300, the controller 110 may control the storage unit 175 so as to store a setting of the display area, which the user has set, as setting information in step 203, and the method loops back to step 201. In performing step 203, the electronic device 100 may also receive such setting information from a user using the input/output module 160, such as the buttons 161 or the keypad, and/or the display unit 190 having a touch screen to operate as an input device.

When the setting information of the display area of the display screen 195, matched to the opening area of the flip cover 300, is not identified or does not exist, the controller 110 may receive from the user the setting information of the display area, which the user has set using the input/output module 160 and/or the display unit 190 having a touch screen. For example, the setting information may include at least one of position data, type data, and order data.

The reception of settings and setting information, for example, position data of the setting information is described as follows. The user may manually input position data of the display area of the display screen 195 matched to the opening area of the flip cover 300.

Figure 5:
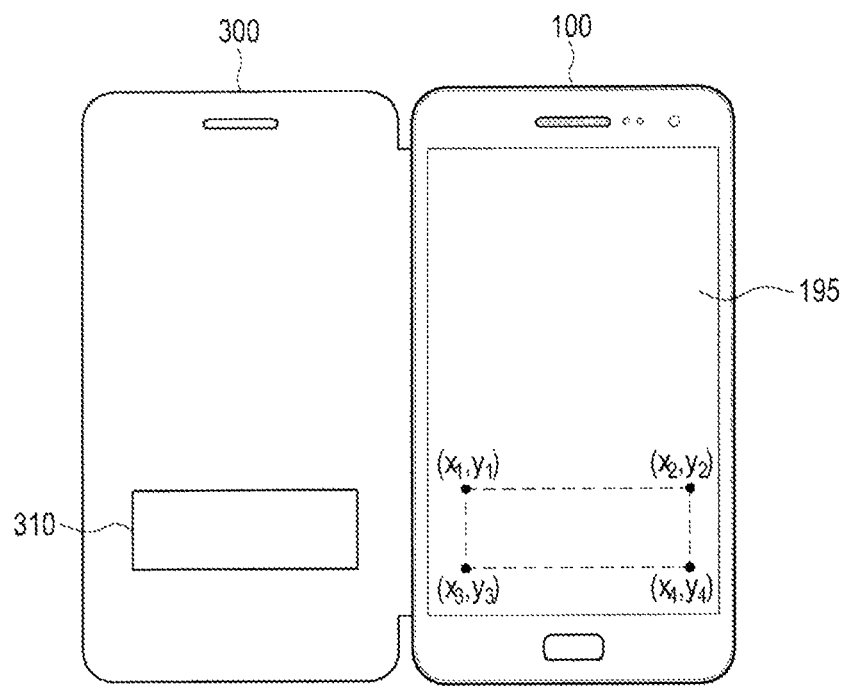
FIG. 5 is a third illustrative view of the process for displaying information in the electronic device on which the flip cover is mounted, according to the exemplary embodiment of the present invention.

Referring to FIG. 5, when the opening area 310 of the flip cover 300 has a rectangular shape, a display area on the display screen 195 which is matched to the opening area 310 also has a substantially rectangular shape which may be substantially identical in size and shape with the opening area 310. Accordingly, the user inputs pixel coordinate values (x1, y1), (x2, y2), (x3, y3) and (x4, y4) of vertices which form a rectangular display area on the display screen 195 in response to the position and shape of the opening area 310, and thereby may set position data of the display area matched to the opening area 310. For example, the controller 110 may determine that the display area matched to the opening area 310 is a rectangle formed by the vertices represented by (x1, y1), (x2, y2), (x3, y3) and (x4, y4) based on position data which is set by the pixel coordinate values (x1, y1), (x2, y2), (x3, y3) and (x4, y4), which the user has input through the input/output module 160 and/or the display unit 190 having a touch screen as the display screen 195.

In an alternative embodiment shown in FIG. 6 and different from the example as described with reference to FIG. 5, the user may directly draw the shape of a figure, matched to the opening area 310 of the flip cover 300, on the display screen 195 by using a touch input to a touch screen of the display screen 195 of the display unit 190, with the touch input represented by the shaded circle in the leftmost drawing in FIG. 6. Position data of the display area matched to the opening area 310 may be set from the shape of the figure which the user has drawn on the display screen 195.

Figure 6:
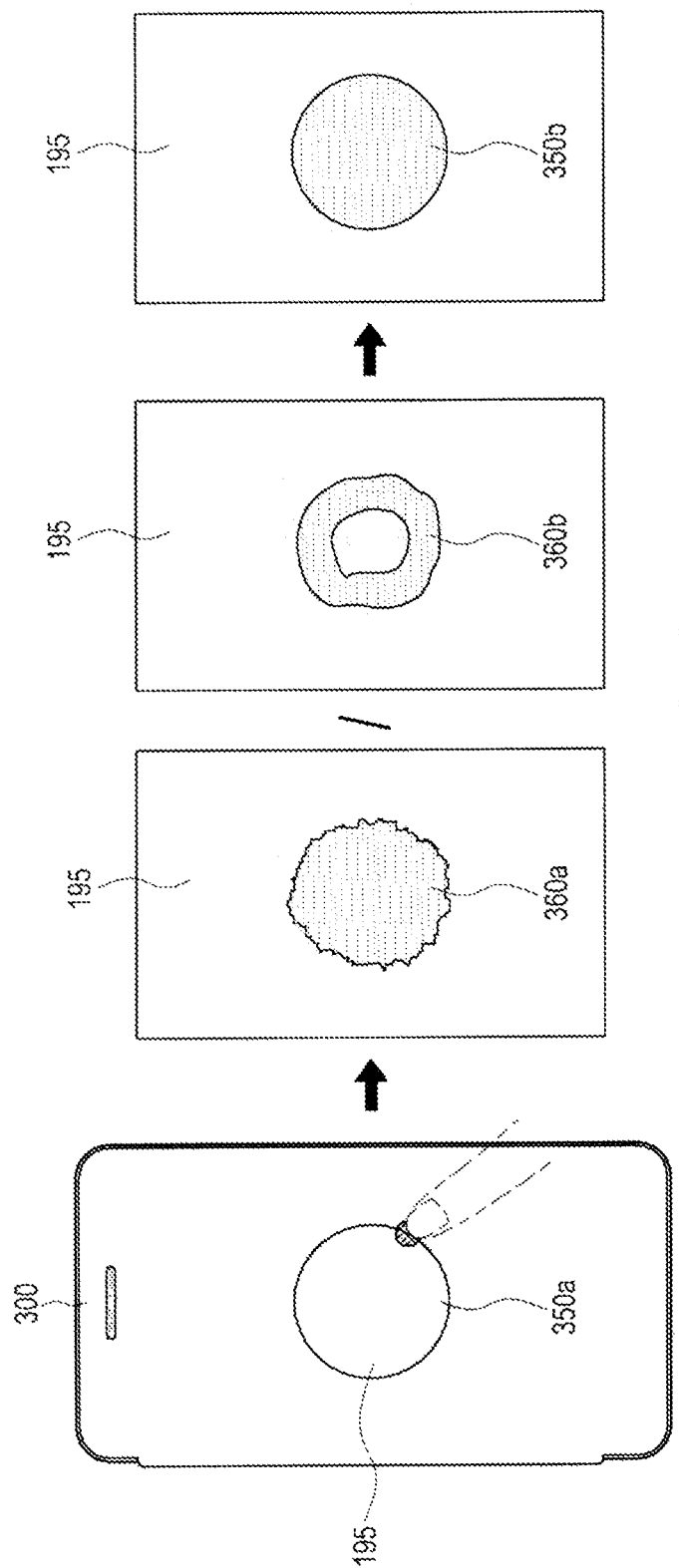
FIG. 6 is a fourth illustrative view of the process for displaying information in the electronic device on which the flip cover is mounted, according to the exemplary embodiment of the present invention.

Referring to FIG. 6, in a state where the flip cover 300 including an opening area 350a is closed, the user enters a touch input 360a or 360b (for example, draws a figure) matched to the shape of the opening area 350a, on a display screen 195 exposed through the opening area 350a. As a result, position data of a display area 350b matched to the opening area 350a may be set.

For example, the controller 110 may determine that the display area 350b matched to the opening area 350a has a display position and a shape, for example, a circle, based on the position data which has been set based on the touch input 360a or 360B. As shown in FIG. 6, the controller 110 may process the roughly drawn shapes from the touch inputs 360a, 360b, and create a more uniform or regular shape, such as a circle or square to be the final shape of the display area 350b, for example, using a library of shapes in the storage unit 175, or using shape recognition methods or shape creation methods known in the art.

Meanwhile, position data of setting information of the display area may be provided by the flip cover 300. For example, after position data, for example, pixel coordinate values, forming the display area of the display screen 195 matched to the opening area 350a of the flip cover 300 is stored in a tag 370 on the flip cover 300 shown in FIG. 3B, for example, a Radio Frequency Identification (RFID) tag or an NFC tag, corresponding to the short-range communication module 132, the flip cover 300 including the RFID tag or the NFC tag as the tag 370 in FIG. 3B, for example, the flip cover 300 to which the NFC tag is attached, may be provided. Then, when the electronic device 100 is combined with the flip cover 300, the controller 110 controls the short-range communication module 132 so as to be capable of acquiring (or identifying) position data of the display area matched to the opening area 350a of the flip cover 300 from the NFC tag of the flip cover 300.

At this time, not only the position data, but also data such as type data or order data may be simultaneously provided by the tag 370 corresponding to the short-range communication module 132 of the flip cover 300. For example, the entire setting information of the display area as described above may be stored in the tag 370 corresponding to the short-range communication module 132 of the flip cover 300. Accordingly, the setting of the display area may be automatically completed.

With respect to the setting information of the display area, a part of the reception of setting of type data is described as follows. The user may set what type of information (for example, output information of which application) is to be displayed in the display area of the display screen 195, which is exposed in a state where the flip cover 300 is closed.

Using the display areas of the display screen 195, which are visible through the opening areas in the flip cover 300, the display areas may operate in a first mode, for example, to always show specific information, such as the time and date through the opening areas and in the display areas whether or not the flip cover 300 is closed. The remaining display areas of the display screen 195, except for the display areas matching the opening areas, display information in a second mode, for example, web pages or other information on the display screen 195, with the second mode only operating when the flip cover 200 is open. In addition, in the second mode, the remaining portion of the display screen 195 may not display the specific which are only displayed in the display area matching the opening area.

Figure 7:
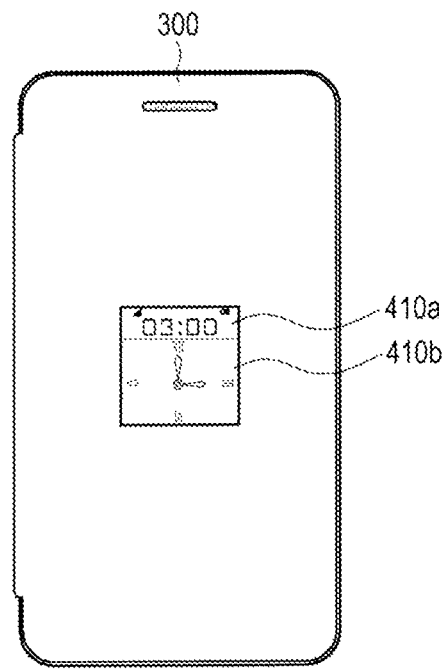
FIG. 7 is a fifth illustrative view of the process for displaying information in the electronic device on which the flip cover is mounted, according to the exemplary embodiment of the present invention.

FIG. 7 illustrates an example where time information (for example, an execution screen of a clock application or a clock widget) is set to be displayed in a display area 410a of the display screen 195 matched to an opening area 410b of the flip cover 300 when the flip cover 300 is closed, as in FIGS. 3A and 7. The clock application is visible in a first mode, in which the time information is visible to the user regardless of whether the flip cover 300 is open or closed. Other information on the display screen 195 is displayed in a second mode, in that the other information is displayed in the remaining portions of the display screen 195 only when the flip cover 300 is open, and such other information is not visible through the opening area 410b of FIG. 7 when the flip cover 300 is closed. In addition, in the second mode, the remaining portion of the display screen 195 may not display the time information which is only displayed in the display area 410a matching the opening area 410b.

Figure 8:
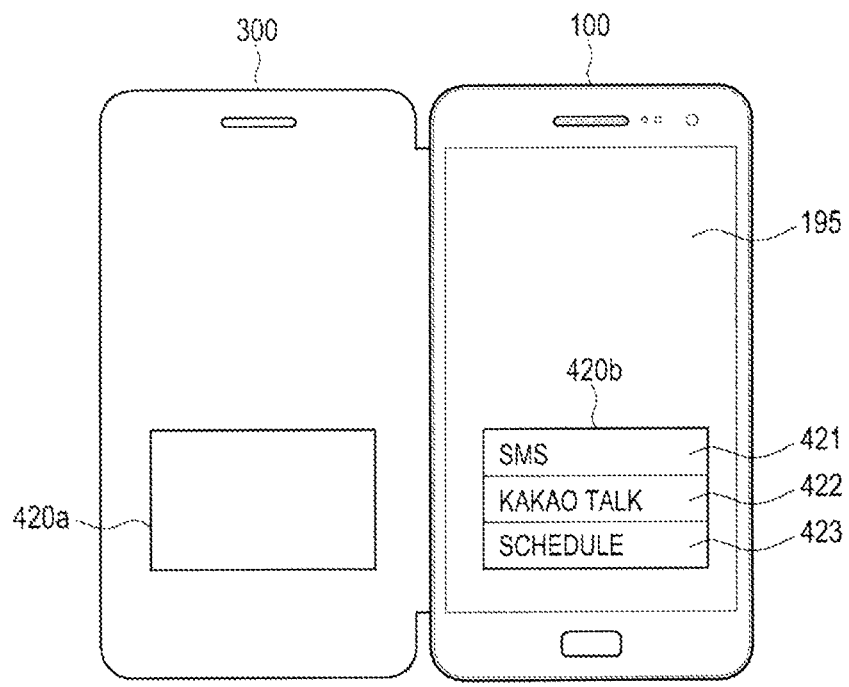
FIG. 8 is a sixth illustrative view of the process for displaying information in the electronic device on which the flip cover is mounted, according to the exemplary embodiment of the present invention.

FIG. 8 illustrates an example where multiple types of information, which is to be displayed in a display area 420b of the display screen 195, matched to an opening area 420a of the flip cover 300, are set when the opening area 420a has a relatively large size. For example, the user may designate multiple applications, of information of each application is to be displayed in the display area 420b in a state where a cover of the flip cover 300 is closed, as shown in FIGS. 3A and 7. Accordingly, whether the flip cover 300 is open as in FIGS. 3B and 8, or closed as in FIGS. 3A and 7, such applications are visible in the first mode to the user directly on the whole display screen 195 as in FIGS. 3B and 8, or through the opening area 420a as in FIGS. 3A and 7.

Referring to FIG. 8, for example, when an SMS application 421, a KAKAOTALK application 422, which is a mobile messenger application commercially available from KAKAO INC., and a schedule application 423 are set as shown in FIG. 8, if the flip cover 300 is closed, the controller 110 may perform a control operation so as to display information (for example, a message or a notification message) of each of the SMS application 421, the KAKAOTALK application 422, and the schedule application 423 in the display area 420b. Accordingly, in the first mode, the applications 421-423 are visible whether or not the flip cover 300 is open or closed, while any applications or information on the remaining portions of the display screen 195 in FIG. 8, outside of the display area 420b, are only visible in the second mode, that is, when the flip cover 300 is open as shown in FIG. 8. In addition, in the second mode, the remaining portion of the display screen 195 may not display the applications 421-423 which are only displayed in the display area 420b matching the opening area 420a.

With respect to setting information of the display area, a part of the reception of setting of order data is described as follows. When there are a plurality of opening areas 430a, 440a and 450a of the flip cover 300 in FIG. 9B, the order of display areas 430b, 440b, and 450b on the display screen 195 in FIG. 59A, in each of which information is to be displayed, may be designated. For example, the user may give the first position in the order to a display area 430b matched to an opening area 430a, may give the second position in the order to a display area 440b matched to an opening area 440a, and may give the third position in the order to a display area 450b matched to an opening area 450a.

Referring back to FIG. 2, if setting information is detected in step 201, the controller 110 may determine whether the cover of the flip cover 300 has been closed in step 204. If not, the method loops back to step 201. Otherwise, when the controller 110 determines in step 204 that the cover of the flip cover 300 has been closed, the controller 110 may perform a control operation in step 205 so as to display previously-set information in the display area based on the setting information, and the method in FIG. 2 then ends.

In various exemplary embodiments of the present invention, the controller 110 may determine whether the cover of the flip cover 300 has been opened or closed, by using the sensor module 170, for example, by using an illuminance sensor or a Hall sensor. At this time, according to the exemplary embodiment of the present invention, when the sensor module 170 corresponds to a Hall sensor, a magnet matched to or in a complementary position relative to the Hall sensor must be mounted on the flip cover 300, such that the magnet and the Hall sensor in the sensor module 170 are in complementary positions when the flip cover 300 is closed. When the flip cover 300 is open the Hall sensor responds to a magnetic field level below a predetermined magnetic field strength threshold to determine that the magnet and, in turn, the flip cover 300 are distant from the Hall sensor, and so the flip cover 300 is open. However, when the flip cover 300 is closed, the Hall sensor responds to a magnetic field level above a predetermined magnetic field strength threshold to determine that the magnet and, in turn, the flip cover 300 are near the Hall sensor, and so the flip cover 300 is closed. Alternatively, the sensor module 170 may include an illuminance sensor which detects that the flip cover 300 is closed when a measured light level detected by the illuminance sensor is below a predetermined light threshold, and which detects that the flip cover 300 is open when a measured light level detected by the illuminance sensor is above a predetermined light threshold.

When the controller 110 determines that the cover of the flip cover 300 has been closed, the controller 110 identifies a position and a shape of the display area matched to the opening area of the flip cover 300, based on the setting information of the display area as described above. Then, the controller 110 performs a control operation so as to display previously-set information of the display screen 195 in display area, such that the position and shape of such information has been identified.

At this time, according to the type of information displayed in the display area or the user's setting, the information displayed in the display area may always be displayed or the information may be displayed at predetermined time intervals. Otherwise, only when an output event occurs, the display unit 190 may first be activated, and information may then be output in the display area on the display screen 195.

For example, when the type of information which is set to be displayed in the display area corresponds to time information, if the cover of the flip cover 300 is closed, time information may always be displayed in the display area or the time information may be displayed at predetermined time intervals therein. As another example, when the type of information which is set to be displayed in the display area corresponds to an SMS message, if an event of receiving a message occurs, the display unit 190 may first be activated, and the contents of the received message may then be scroll-displayed in the display area.

Referring to FIG. 10A, when the type of information which is to be displayed in a display area 460b of the display screen 195 matched to an opening area 460a of the flip cover 300 corresponds to an indicator bar and an SMS message, before the reception of the SMS message, the controller 110 may perform a control operation so as to display only information (for example, battery information, electric field information, and time information) in an indicator bar in the opening area 460a. Then, when the SMS message is received, the controller 110 may perform a control operation so as to scroll-display the information of the indicator bar and the received SMS message in the opening area 460a.

In another example, shown in FIG. 10B, when the type of information, which is previously set to be displayed in a display area 470b on the display screen 195 matched to an opening area 470a through the identification of the setting information, corresponds to only an SMS message, only if the SMS message is received, the controller 110 activates the display unit 190, and controls the display unit 190 so as to display, on the display screen 195, the received SMS message in the display area 470b of the display screen 195.

In addition, a electronic device in the prior art causes red-colored, green-colored, or blue-colored LEDs to flicker on and off, and notifies the user of an event, for example, a voice call and the reception of a message, or an event required to charge a battery, generated by the electronic device in the prior art. The exemplary embodiment of the present invention may provide the function in the prior art of an event notification using LEDs or specific colors on the display screen 195 in the display area matched to the opening area of the flip cover 300. Accordingly, when the type of information displayed in the display area corresponds to a function of notification of an event occurrence, the exemplary embodiment of the present invention may display a graphic effect similar to flickering of LEDs on the display screen 195 in the display area.

Figure 11:
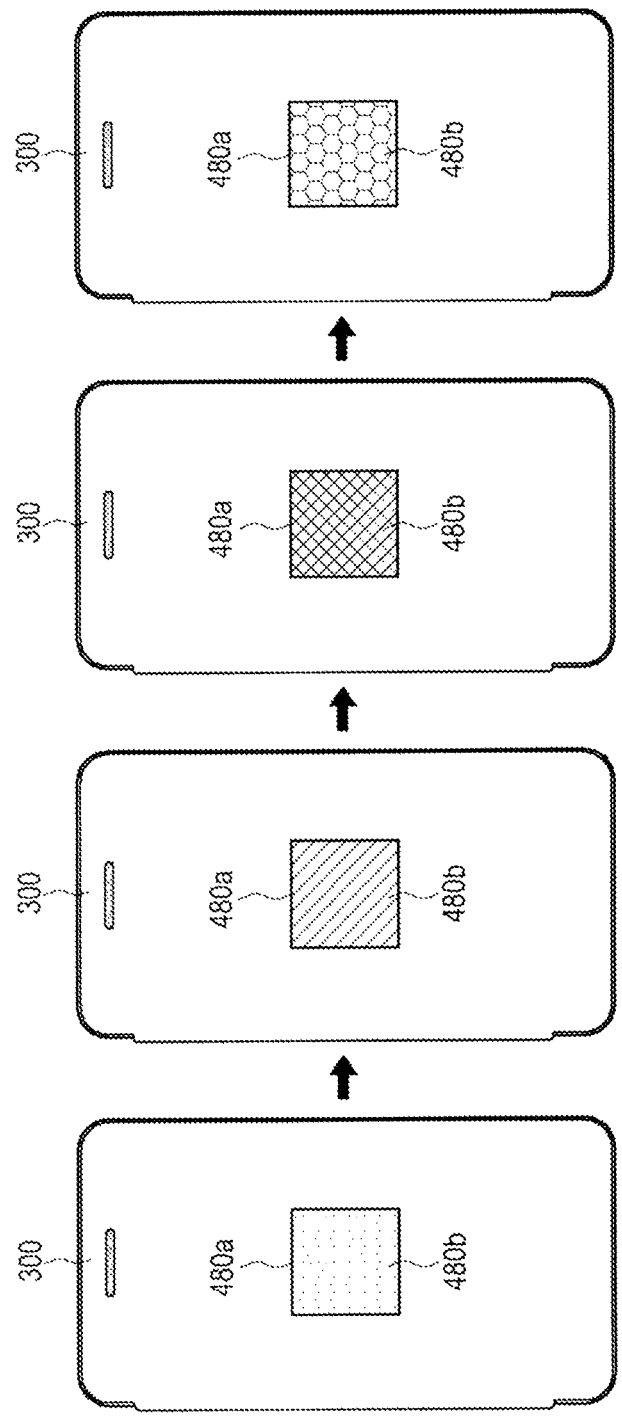
FIG. 11 is a ninth illustrative view of the process for displaying information in the electronic device on which the flip cover is mounted, according to the exemplary embodiment of the present invention.

For example, as illustrated in FIG. 11, a configuration for repeatedly displaying different colors at predetermined time intervals in a display area 480b, matched to an opening area 480a of the flip cover 300, may replace or supplement the function in the prior art of notification of an event occurrence using LEDs. As shown in FIG. 11, the differently shaded display areas 480b of the display screen 195 visible through the same opening area 480a, while the cover 300 is closed, provide the flickering graphic effect without using LEDs.

The methods according to the exemplary embodiments of the present invention may be implemented in the form of a program of instructions executable by various computer components, and may be recorded on a non-transitory computer-readable medium. The non-transitory computer-readable medium can include a program of instructions, data files, data structures, and the like, or a combination thereof. The program of instructions recorded on the non-transitory medium may be specially designed and configured for the present invention, or may be publicly known and available to those having ordinary knowledge in the field of computer software.

The above-described apparatus and methods according to the present invention can be implemented in hardware or firmware, or as software or computer code, or combinations thereof. Various components such as a controller, a central processing unit (CPU), a processor, and any unit or device described herein includes at least hardware and/or other physical structures and elements. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

According to the various exemplary embodiments of the present invention, when a cover of a flip cover 300, a sliding cover, or a folder cover for protecting the electronic device 100 is located within a predetermined range of distance from the display screen 195 of the display unit 190 of the electronic device 100, for example, when the cover 300 is closed or is close to the display unit or display screen 195 by about 5 mm., a user can conveniently identify information even without opening the cover 300. Also, in a public place, the privacy of the user can be protected, and the user can observe the rules of etiquette, since the entire display screen 195 is not displayed, although other information such as the time may be visible through the opening areas. Therefore, the convenience of the user can be improved.

While the present invention has been shown and described with reference to certain exemplary embodiments thereof, it will be understood by those skilled in the art that various changes in form and details may be made therein without departing from the spirit and scope of the present invention as defined by the appended claims and equivalents thereof.

What is claimed is:

1. A method for displaying information by using an electronic device, the method comprising:
   identifying at least one display area matched to at least one opening area formed in a part of a cover of the electronic device, by determining pixel coordinate values on a display screen of a display unit of the electronic device, which are at least matched to the opening area, from at least one display area displayed on the display screen of the display unit; and
   operating the at least one display area matched to the at least one opening area in a first mode, and operating at least a partial area of a remaining display area of the display screen in a second mode.

2. The method as claimed in claim 1, wherein identifying the at least one display area comprises determining at least one of an exposed area, a transparent area, and a translucent area, which is formed in the cover, as the opening area.

3. The method as claimed in claim 1, wherein operating the at least one display area in the first mode comprises displaying first information in the at least one display area, and operating the at least partial area of the remaining display area of the display screen in the second mode comprises displaying second information in the at least partial area.

4. The method as claimed in claim 1, wherein operating the at least one display area in the first mode comprises displaying first information in the at least one display area, and operating the at least partial area of the remaining display area of the display screen in the second mode comprises not displaying the first information in the at least partial area.

5. The method as claimed in claim 1, wherein operating the at least one display area in the first mode comprises displaying, in the at least one display area, at least one of position data of the at least one display area, type data which sets a type of information which is to be displayed in the at least one display area, and order data which, when the at least one display area includes a plurality of display areas, sets an order of displaying the plurality of display areas.

6. The method as claimed in claim 5, wherein displaying, in the at least one display area, comprises receiving at least one of the position data, the type data and the order data from a tag corresponding to a short-range communication module of the electronic device.

7. The method as claimed in claim 6, wherein the tag is included in the cover.

8. The method as claimed in claim 1, further comprising designating the at least one display area to at least respond to a user input.

9. The method as claimed in claim 1, further comprising designating the at least one display area using the determined pixel coordinate values.

10. The method as claimed in claim 1, wherein identifying the at least one display area is performed when the cover is within a predetermined range of distance from the display screen of the display unit.

11. An electronic device comprising:
a display unit having a display screen;
a cover in which at least one opening area is formed; and
a controller configured to identify at least one display area matched to the at least one opening area on the display screen, by determining pixel coordinate values on the display screen of the display unit of the electronic device, which are at least matched to the opening area, operate the at least one display area matched to the at least one opening area in a first mode, and operate at least a partial area of a remaining display area of the display screen in a second mode, when the controller determines that the cover is at a predetermined distance from the display screen of the display unit.

12. The electronic device as claimed in claim 11, wherein the at least one display area, which is matched to the at least one opening area, is exposed through the at least one opening area of the cover on the display screen when the cover is closed.

13. The electronic device as claimed in claim 11, wherein the controller uses setting information comprises at least any one of:
position data of a position and a shape of the at least one display area in an entire area of the display screen, with the at least one display area exposed through the at least one opening area when the cover is closed;
type data which sets a type of information which is to be displayed in the at least one display area; and
order data which sets an order of displaying a plurality display areas when the at least one display area includes the plurality of display areas.

14. The electronic device as claimed in claim 13, wherein at least any one of the position data, the type data and the order data of the setting information is stored in a tag matched to a short-range communication module, and the tag is included in the cover.

15. The electronic device as claimed in claim 13, wherein the controller performs a control operation so as to receive at least one of the position data, the type data, and the order data, and controls a storage unit so as to store the received at least one of the position data, the type data and the order data as the setting information.

16. The electronic device as claimed in claim 15, wherein the position data is set by receiving pixel coordinate values of the display area matched to the opening area.

17. The electronic device as claimed in claim 15, wherein the position data is set by a touch input which is input in an area of the display screen, which is exposed through the at least one opening area.

18. The electronic device as claimed in claim 17, wherein the touch input is input in a state in which the cover is closed.

19. The electronic device as claimed in claim 11, wherein the controller controls a sensor module to sense that the cover is at a predetermined distance from the display screen of the display unit.

20. A non-transitory computer-readable recording medium storing instructions of a program that, when executed by a processor of an electronic device, perform a method, the method comprising:
identifying at least one display area matched to at least one opening area formed in a part of a cover of the electronic device, by determining pixel coordinate values on a display screen of a display unit of the electronic device, which are at least matched to the opening area, from, at least one display area displayed on the display screen of the display unit; and
operating the at least one display area in a first mode matched to the at least one opening area in a first mode, and operating at least a partial area of a remaining display area of the display screen in a second mode.

21. An electronic device comprising:
a cover with at least one opening area;
a display unit comprising a display screen, the display screen comprising:
at least one display area on a display screen of a display unit with pixel coordinate values corresponding the to at least one opening area formed in a part of a cover of the electronic device in a first mode, the at least one display are on the display screen configured to operate in a first mode; and
at least a partial area of a remaining display area in a second mode configured to operate in a second mode.

* * * * *

UNITED STATES PATENT AND TRADEMARK OFFICE
CERTIFICATE OF CORRECTION

| | | |
|---|---|---|
| PATENT NO. | : 9,294,596 B2 | Page 1 of 1 |
| APPLICATION NO. | : 14/194900 | |
| DATED | : March 22, 2016 | |
| INVENTOR(S) | : Geon-Soo Kim | |

It is certified that error appears in the above-identified patent and that said Letters Patent is hereby corrected as shown below:

In the Claims:

Column 18, Claim 21, Lines 48-49 should read as follows:
--...corresponding to the at...--

Signed and Sealed this
Seventeenth Day of May, 2016

Michelle K. Lee
*Director of the United States Patent and Trademark Office*